CODE COMMUNICATION SYSTEM

Filed June 15, 1964

INVENTORS
W. R. SMITH, K. H. FRIELINGHAUS
AND A. W. WETMORE
BY Forest B. Hitchcock
THEIR ATTORNEY INVENTORS
W.R. SMITH, K.H. FRIELINGHAUS
BY AND A.W. WETMORE
Forest B. Hitchcock
THEIR ATTORNEY

TYPICAL SHIFT REGISTER CIRCUITRY

MASTER CLOCK

OFFICE WAVEFORMS

INVENTORS
W.R.SMITH, K.H.FRIELINGHAUS AND A.W.WETMORE
BY Forest B. Hitchcock
THEIR ATTORNEY INVENTORS
W.R. SMITH, K.H. FRIELINGHAUS
AND A.W. WETMORE
BY Forest B. Hitchcock
THEIR ATTORNEY United States Patent Office 3,449,717

Patented June 10, 1969

3,449,717

CODE COMMUNICATION SYSTEM

Willis R. Smith, Klaus H. Frielinghaus, and Arthur W. Wetmore, Rochester, N.Y., assignors to General Signal Corporation, Rochester, N.Y., a corporation of New York Filed June 15, 1964, Ser. No. 374,918
Int. Cl. G08b *29/00;* G06f *11/12*
U.S. Cl. 340—146.1 14 Claims

ABSTRACT OF THE DISCLOSURE

A code communication system in which a transmitting station monitors various functions of apparatus and sends a coded message corresponding to the monitored functions along with a unique checking code to a receiving station. The check code consists of an identifying code sent prior to the message and a complement of this identifying code sent at the end of the message, means are provided at the receiving station for receipt of the coded message and for checking the authenticity of the message by comparison between the identifying code and its complement.

This invention relates to telemetering systems and more particularly to systems for transmitting codes from a field station to a control office with assurance that the received message is authentic.

In telemetering systems wherein a field station transmits encoded information to an office in response to monitored functions, it is desirable to provide means at the office for indicating the actual condition of the field station. Systems of this nature have wide application in railway centralized traffic control systems, pipeline control and monitoring systems, etc.

Heretofore, telemetering systems of the aforementioned type have required myriad relays, with attendant large power requirements, large volume installations, and costly relay maintenance requirements. The present invention overcomes these disadvantages by making extensive use of solid state devices, thereby increasing reliability and decreasing power and space requirements. This enables rapid transmission of data, permitting substantially continuous monitoring of field functions at the office.

To insure authenticity of received messages, the system described herein utilizes a unique checking operation. Briefly described, the checking operation is accomplished by adding an identifying code at the beginning of a message and the complement of this identifying code at the end of the message. In the system herein disclosed, the identifying code comprises five digits, and hence the complements thereof also comprises five digits. As each of the digits in the complement of the identifying code is received, it is checked with the corresponding ordinal digit in the identfying code. If the check proves that the final five digit code is the complement of the initial five digit code, the message is recognized as authentic, permitting execution of all data constituting the message.

Accordingly, one object of this invention is to provide a new and improved telemetering system utilizing solid state devices.

Another object is to provide a telemetering system utilizing few circuit components to check for authenticity of received data.

Another object is to provide a high speed telemetering system having minimal power and space requirements.

Another object is to provide a reliable telemetering system wherein field functions may be monitored substantially continuously at an office location.

Another object is to provide a telemetering system having a selectively operated slow rate of bit transmission for facilitating rapid identification of malfunctioning apparatus.

The invention contemplates a transmitting station or field station for monitoring various functions of apparatus, a receiving station or office for receiving the coded functions, and communication means linking the field station with the receiving station. Means are provided at the field station for transmitting a message corresponding to the monitored functions, along wtih a unique checking code. This code is repetitively transmitted from the field station at a rate which may normally be on the order of two thousand bits of information per second. Means are provided at the receiving station for receipt of the coded message along with the unique checking code. In addition, storage means are provided to retain the last-received authentic message. Additional means are provided for significantly slowing the rate of transmission of the information bits, in order to facilitate identification of defective equipment.

The foregoing and other objects and advantages of the invention will become apparent from the following detailed description when read in conjunction with the accompanying drawings in which.

Figure 1:
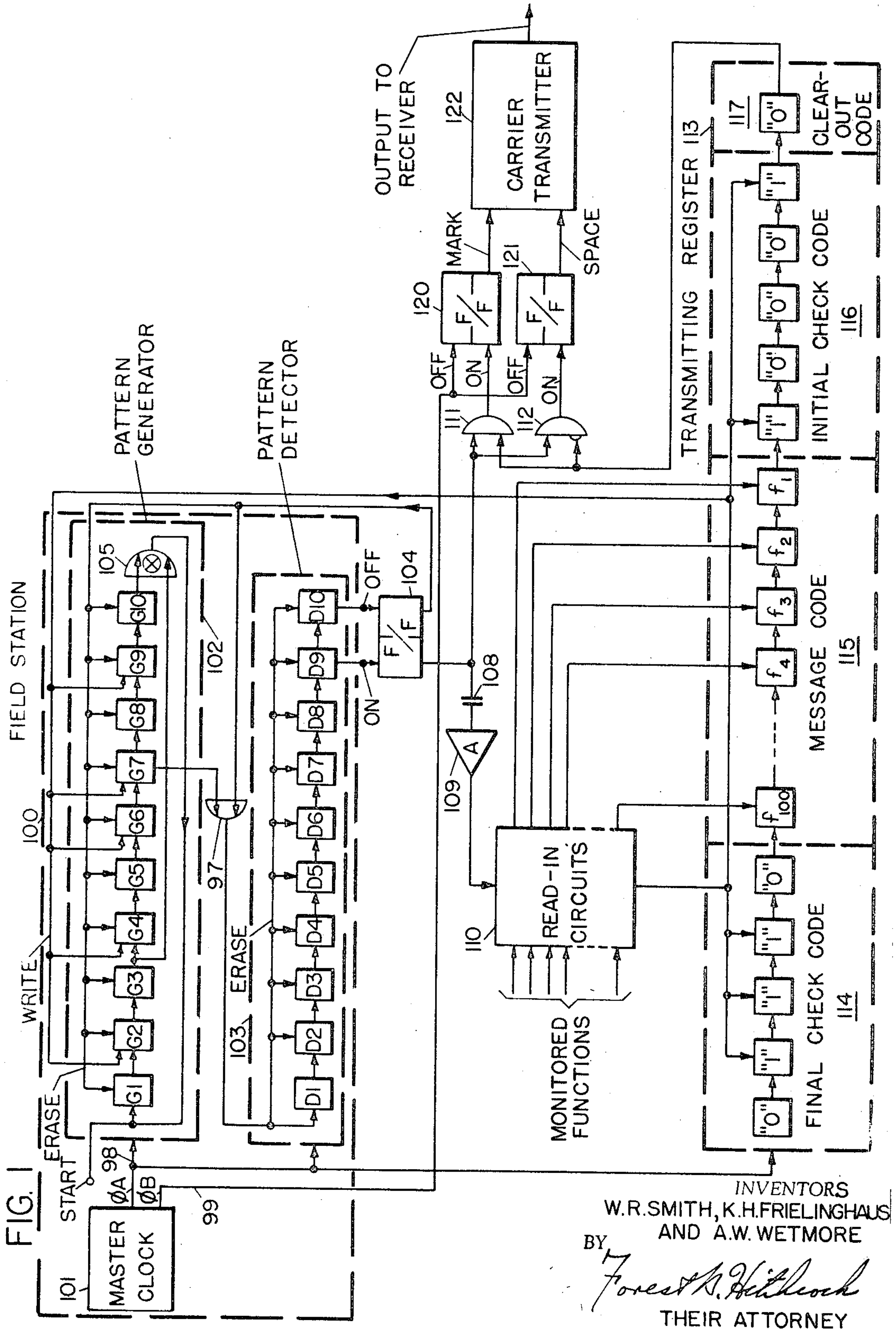
FIG. 1 is a block diagram of the field station which transmits data to the office.

Turning now to FIG. 1, there is shown a timing circuit 100. This circuit comprises a master clock 101 for producing successive, regularly-spaced output pulses in an alternate manner on each of a pair of output leads 98 and 99, a pattern generator 102, comprising a modified ten-stage shift register, and a pattern detector 103, also comprising a ten-stage shift register. The pulses on leads 98 and 99 are of opposite phase, and are designated $\phi A$ and $\phi B$, respectively. The pattern generator stages are designated G1–G10, and the pattern detector stages are designated D1–D10. These shift registers, which are driven by master clock 101, may be constructed of multiaperture ferrite cores, silicon controlled switches, or any other suitable switching devices.

It will be noted that the stages in the pattern generator are connected in a predetermined configuration, whereby, in addition to each stage supplying a signal to the next succeeding stage, as in a common shift register, stages G3 and G10 may also supply a signal to stage G1. To accomplish this function, stages G3 and G10 are coupled to stage G1 by means of an EXCLUSIVE OR circuit 105, whereby an output from either of stages G3 and G10, but not both of these stages simultaneously, produces a feedback signal to stage G1. If a single input pulse is now supplied to the START terminal of pattern generator 102, which is coupled to stage G1, it can be proven that the pattern generator will establish a different code within itself each time master clock 101 shifts information from each stage to the next successive stage coupled thereto. In this fashion, 1023 different codes are established in the pattern generator in a regular predetermined order, or pattern. When these 1023 codes have been produced, the pattern generator resumes producing the 1023 codes over again, in the same order, and so on.

Each stage of pattern detector 103 supplies a signal to the next successive stage therein. Input signals to the first stage of pattern detector 103 are supplied from stage G7 of pattern generator 102 through one input of an OR circuit 97. Simultaneously, each input signal to the pattern detector from stage G7 of the pattern generator clears out information which may exist in any of stages D2–D10 and also establishes a binary ONE in stage D1, through an ERASE lead. Pulses comprising the output signals of timer 100 are supplied to a flip-flop circuit 104 from stages D9 and D10 of pattern detector 103. Output from stage D9 operates the flip-flop to an "on" condition, while output from stage D10 operates the flip-flop to an "off" condition. An output pulse is supplied from flip-flop circuit 104, when switched into the "off" condition, to the other input of OR circuit 97.

Output signals are supplied from flip-flop circuit 104, when in the "on" condition, to read-in circuits 110 through a series-connected capacitor 108 and amplifier 109, as well as to a first input to each of two-input AND circuits 111 and 112. Hence, whenever flip-flop circuit 104 switches to its "on" condition, a momentary trigger pulse is supplied to read-in circuits 110, while a steady input signal is supplied to the first inputs of AND circuits 111 and 112 during the entire interval in which flip-flop 104 remains "on." The pulse supplied to the read-in circuits is produced because capacitor 108 is coupled between the output of flip-flop circuit 104 and the input of read-in circuits 110, blocking any steady-state current which would otherwise be provided by the flip-flop. An amplifier 109 is utilized between capacitor 108 and read-in circuits 110 for the purpose of boosting the amplitude of the pulse supplied to the read-in circuits when flip-flop circuit 104 switches into its "on" condition. Those skilled in the art will recognize that read-in circuits 110 may comprise a separate switching circuit for each function monitored, for the purpose of supplying a momentary output pulse from the read-in circuits to the message portion 115 of a transmitting shift register 113 whenever an input pulse is received by the read-in circuits. The transmitting shift register is driven by master clock 101.

In addition to establishing a code in message portion 115 of transmitting register 113, each trigger pulse supplied to read-in circuits 110 produces an output pulse therefrom which is coupled to the final check code portion 114 and initial check code portion 116 of transmitting register 113. It will be noted that the final check code portion 114 and initial check code portion 116 each comprise, in the embodiment herein disclosed, a 5-stage shift register, while the message code portion 115 comprises a 100-stage shift register. Hence, triggering of read-in circuits 110 causes establishment of a "ONE" condition in each of the end stages in initial check code portion 116 of the transmitting register and in each of the inner stages of final check code portion 114 of the transmitting register. The inner stages of initial check code portion 116 and end stages of final check code portion 114 of the transmitting register receive no input signal from the read-in circuits. Hence, each time read-in circuits 110 receive a trigger pulse, the inner stages of initial check code portion 116 and the end stages of final check code portion 114 of the transmitting register remain in a ZERO condition. Similarly, a single shift register stage comprising a clear-out code portion 117 of transmitting register 113 also remains in a ZERO condition at this time. The transmitting register is driven by master clock 101, so that serial readout of the transmitting register sequentially produces first the clear-out code, then the initial check code, then the message code, and finally the final check code.

Output from transmitting register 113 is coupled to second inputs of each of AND circuits 111 and 112. It will be noted that the second input to AND circuit 112 is a NOT input. Consequently, the second input to AND circuit 111 is fulfilled by ONES, while the second input to AND circuit 112 is fulfilled by ZEROS.

Output from AND circuit 111 operates a flip-flop circuit 120 to an "on" condition, while output from AND circuit 112 operates a flip-flip circuit 121 to an "on" condition. $\phi$B pulses from master clock 101 simultaneously operate both flip-flops 120 and 121 to an "off" condition. Flip-flops 120 and 121 function as pulse stretcher circuits and are required in order to produce pulses from AND circuits 111 and 112 of sufficient duration to key a carrier transmitter 122, which is preferably of the frequency shift keying, of FSK type. It will be noted that ONES coupled through AND circuit 111 and flip-flop circuit 120 produce mark outputs from carrier transmitter 122, while ZEROS coupled through AND circuit 112 and flip-flop circuit 121 produce space outputs from carrier transmitter 122. Output signals from the field station which are produced by carrier transmitter 122 are then coupled to a receiver situated at the office.

Whenever flip-flop circuit 104 is switched to the "off" condition, existing data in pattern generator 102 is destroyed by the resulting change in current flow to each pattern generator through an ERASE lead. The output pulse supplied from read-in circuits 110 to the final and initial check code portions of transmitting register 113 whenever the read-in circuits are triggered, is also coupled to stages G2, G4, G6, G7 and G9 of pattern generator 102 through a WRITE lead for the purpose of establishing a ONE in each of these stages. The pattern thus created in the pattern generator then represents a particular starting point from which the pattern generator begins to run through its entire schedule of patterns. However, the schedule is interrupted each time the pattern generator has run through 111 patterns, since at this instant flip-flop circuit 104 is switched "off." After the time required for 9 more patterns to be generated has elapsed, read-in circuits 110 are again triggered.

When power is first applied to the field station, flip-flop circuit 104 assumes its "on" condition. This operation produces a pulse through amplifier 109, which serves to trigger read-in circuits 110, causing momentary application of a binary code to transmitting register 113 in accordance with the monitored functions. In addition, the initial and final check codes are also established in the transmitting register. However, this data initially furnished to transmitter register 113 is aborted at the office, since proper synchronization of the timer with the transmitting register is not achieved until several cycles of field station operation, which usually require a total time of less than one second, have elapsed. Hence, this initially-supplied data is ignored in the ensuing description. Once the system achieves synchronization, however, it remains synchronized.

When a pulse of energy is supplied to the START terminal of time 100, stage G1 of the pattern generator switches to a ONE condition. This, in effect, establishes a pattern in the pattern generator. The pattern generator then begins progressing through its schedule of patterns. Each time a ONE is established in stage G7 of the pattern generator, an input is provided to the pattern detector which simultaneously establishes a ONE in stage D1 and a ZERO in each of stages D2–D10. The master clock then drives the ONE existing in stage D1 through subsequent stages of the pattern detector. If prior to the time that the ONE reaches stage D10 of the pattern detector, stage G7 of the pattern generator provides an output, the ONE in the pattern detector, which has progressed out of stage D1 to a subsequent stage, is cleared-out, and a new ONE is established in stage D1. Eventually, however, a ONE is supplied to stage D1 of the pattern detector which is shifted to stage D10, thereby switching flip-flop circuit 104 to an "off" condition. This operation serves to erase all data stored in stages G1–G10 of the pattern generator, and in addition serves to erase all data existing in stages D2–D10 of the pattern detector while simultaneously supplying a ONE to stage D1 of the pattern detector. Thus, during the interval in which no data exists in pattern generator 102, the latter ONE is shifted through stages D1–D9 of the pattern detector, turning flip-flop circuit 104 "on" upon reaching stage D9. This delineates initiation of the second cycle of field station operation. Again, read-in circuits 110 are triggered, and the data thus supplied to transmitting register 113 will ultimately be accepted by the office.

It should be noted that in order to switch flip-flop circuit 104 "on," pattern generator 102 must necessarily remain in its "erased" condition for 8 cycles of the master clock. The next clock cycle produces an output pulse, comprising a ONE, from stage G7 of the pattern generator, thereby erasing the ONE existing in stage D9 of the pattern detector and establishing a new ONE in stage D1 of the pattern detector. This leaves flip-flop circuit 104 in the "on" condition.

In a manner well known in the art, each $\phi$A pulse produced by the master clock advances the data bits through transmitting register 113, although it is equally well known in the art to utilize both the $\phi$A and $\phi$B pulses to advance each bit from one stage of a shift register to the next. As long as flip-flop circuit 104 remains "on," the first inputs to AND circuits 111 and 112 are fulfilled. Each ONE in transmitting register 113 is then coupled through AND circuit 111 to flip-flop circuit 120, turning it "on," while each ZERO produced by register 113 is coupled through AND circuit 112 to flip-flop circuit 121, turning it "on." Each $\phi$B pulse of the master clock turns both flip-flop circuits 120 and 121 "off." Thus, carrier transmitter 122 is keyed with marks and spaces from flip-flop circuits 120 and 121, respectively. Because flip-flop circuits 120 and 121 when turned "on," remain "on" substantially during the entire interval between the start of a $\phi$A pulse and the start of the next-following $\phi$B pulse, they function as pulse stretchers within the system. In general, transmission of a mark comprises transmission of a frequency above the carrier frequency, while transmission of a space comprises transmission of a frequency below the carrier frequency. The carrier frequency itself may be considered to comprise a rest frequency, which is transmitted in the absence of both mark and space inputs to the carrier transmitter.

Because transmitting register 113 comprises 111 stages in the embodiment shown in FIG. 1, the pattern generator is connected so as to provide 111 codes subsequent to the time at which stage D9 of the pattern detector is in a ONE condition, in order to establish a ONE in stage D10 of the pattern detector for the purpose of turning flip-flop circuit 104 "off." For this to occur, the 102nd pattern produced by pattern generator 102 causes stage G7 to supply a ONE to stage D1 of the pattern detector. The 103rd through 111th patterns produced by the pattern generator subsequent to the time at which flip-flop circuit 104 is initially turned "on" each require that stage G7 of the pattern generator produce a ZERO output. Under these circumstances, the ONE established in stage D1 of the pattern detector as a result of the 102nd code produced by the pattern generator subsequent to the time at which flip-flop circuit 104 is initially turned "on," is stepped through every stage of pattern detector 103. When this ONE reaches stage D9, there is no effect on the system, since flip-flop circuit 104 is already "on" as a result of the previous instant at which a ONE had arrived at stage D9. However, when the ONE is advanced from stage D9 to stage D10 as a result of the 111th pattern produced by pattern generator 102, flip-flop circuit 104 is turned "off." At this juncture, every stage of transmitting register 113 is in a ZERO condition, the information formerly stored therein having been transmitted to the office.

When stage D10 of the pattern detector receives the ONE, a rest condition is initiated during which the transmitter is keyed by neither mark nor space inputs and merely generates its unmodulated carrier frequency. Flip-flop circuit 104, upon being switched to an "off" condition, establishes a ONE in stage D1 of the pattern detector and clears stages D2–D10. Simultaneously, all data present in the pattern generator is destroyed by the change in current flow through the ERASE lead coupled to flip-flop circuit 104. Following estabishment of the latter ONE in stage D1 of the pattern detector, the next 8 bits produced from stage G7 of the pattern generator are ZEROS. Thus, the ONE established in stage D1 of the pattern detector reaches stage D9, turning "on" flip-flop circuit 104. The rest condition is thereby terminated, and a new code is established in transmitting register 113. In addition, a new code is established in pattern generator 100, enabling it to again produce 111 patterns before turning flip-flop circuit 104 "off," as previously explained.

Therefore, it can be seen that codes are repetitively established in transmitting register 113 and transmitted to the office automatically, once normal operation is begun. Each complete cycle of transmission requires the time expended in production of 120 consecutive patterns by the pattern generator, which is the total of the aforementioned 111 patterns plus the patterns required to subsequently establish the ONE in stage D1 of the pattern detector, followed by the 8 ZEROS. However, the system is not limited to a 100 bit message code; obviously, a much larger bit code may be accommodated by the transmitting register simply by use of additional stages therein, and by adjustment of the pattern generator circuitry so as to produce the required schedule of patterns. Additional detailed information regarding the pattern generator and pattern detector, as constructed of multiaperture ferrite cores, may be found in the article entitled Programmable Timer: Utilizing A Feedback Shift Register And Sequence Detectors, by R. H. Braasch et al., on pages 14–5–1 through 14–5–4 of the 1964 Proceedings of the Intermag Conference of the I.E.E.E.

Figure 2:
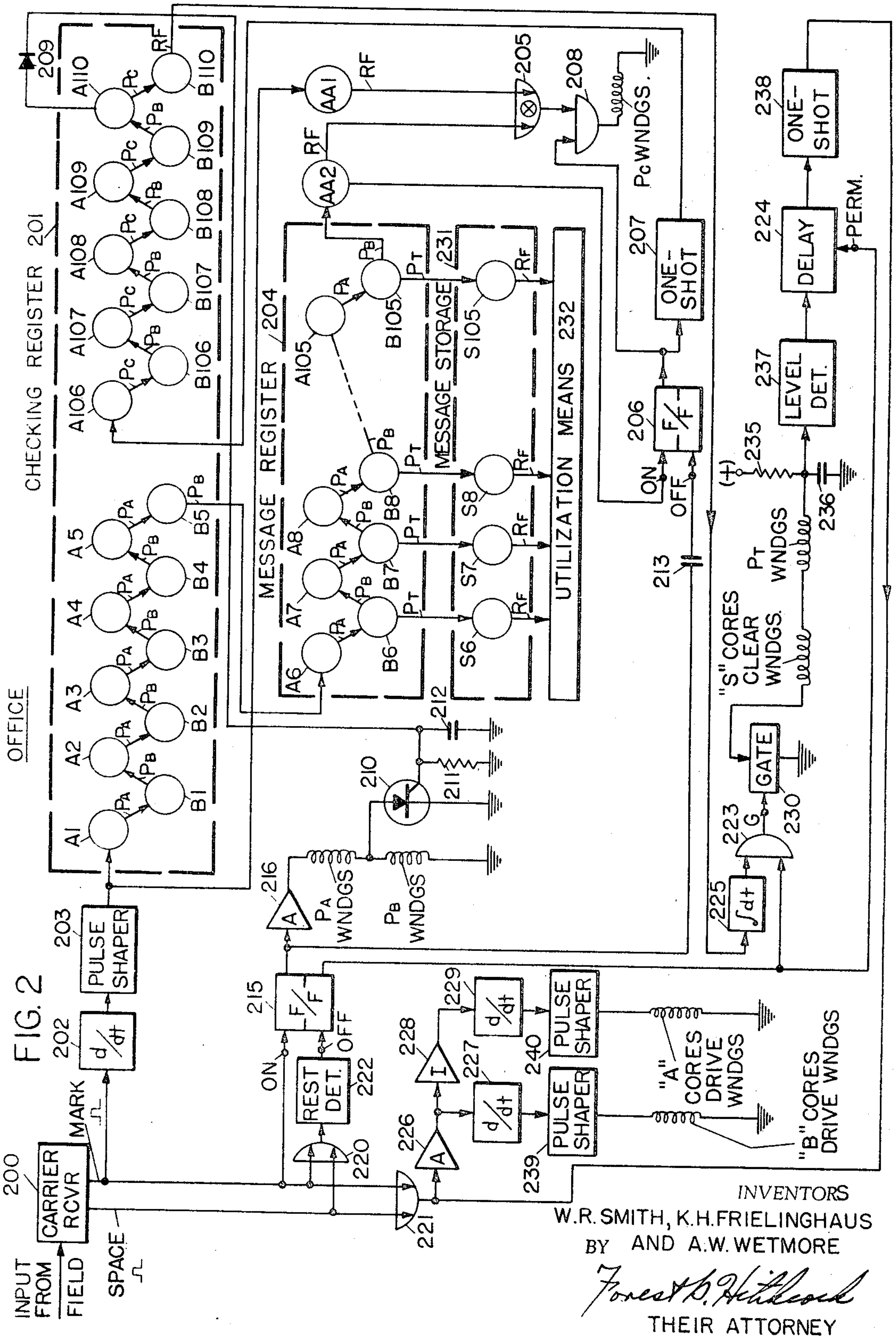
FIG. 2 is a block diagram of the office which receives, checks, stores and displays data received from the field station.

FIG. 2 is a typical embodiment of the office circuit configuration. The coded data produced by the field station of FIG. 1 is received by a carrier receiver 200, wherein the received signal is decoded into mark and space outputs. The mark outputs are coupled to a checking register 201, which actually comprises two separate shift registers, through a differentiator circuit 202 in series with a pulse shaper circuit 203. It should be noted that both the mark and space output pulses from carrier receiver 200 are of positive polarity. Differentiator circuit 202 initiates a positive output pulse upon occurrence of the leading edge of each mark pulse. Pulse shaper 203 then operates on the pulse produced by differentiator circuit 202 in order to provide a pulse of proper amplitude and width and thereby facilitate utilization of this pulse by the first stage of checking register 201.

Each stage of checking register 201 comprises a pair of multiaperture ferrite cores. For example, the first stage of checking register 201 comprises cores A1 and B1, the second stage of checking register 201 comprises cores A2 and B2, etc. The first five stages of the checking register comprise the initial portion thereof, while the last five stages comprise the final portion. Output from the fifth stage of checking register 201 is coupled from core B5 to a first core A6 in a message register 204 which comprises a 100 stage shift register in order to accommodate the 100 bit message word received from the field station. Each stage of the message register comprises a pair of multiaperture ferrite cores, such as A6 and B6, A7 and B7, etc., through cores A105 and B105. A core in a set condition is considered to have a binary ONE stored therein; a core in a clear condition is considered to have a binary ZERO stored therein.

Output from message register 204 is coupled to a message register readout multiaperture ferrite core AA2. Similarly, each mark pulse produced by pulse shaper 203 is also coupled to a multiaperture ferrite core AA1. When core AA1 or AA2 is in a set condition, radio frequency energy is coupled therefrom to an EXCLUSIVE OR circuit 205. The manner by which radio frequency output signals may be transmitted from a core in the set condition is well known in the art.

Single output pulses produced from core AA2 each time core AA2 is set by core B105 are coupled to the ON input of a flip-flop circuit 206. Each time flip-flop circuit 206 is turned "on," a one-shot multivibrator 207 is triggered in response thereto. The output pulse produced by the one-shot multivibrator is then coupled to a core A106 in the final portion of checking register 201, setting the core. Because this core is not directly energized from core B5, it may also be considered as the initial core of a third office shift reigster. Simultaneously, output from flip-flop circuit 206, when in the "on" condition, is coupled to one input of a two-input AND circuit 208, the second input of which is fulfilled by output from EXCLUSIVE OR circuit 205. Output energy from AND circuit 208 energizes prime windings $P_C$, coupled through cores A106, A107, A108, A109 and A110 in the final portion of the checking register. It will be noted that energization of prime windings $P_C$ permits transfer of signals from cores A106–A110 to cores B106–B110 of the checking register, respectively.

When the first ONE of the initial portion of the checking code arrives at core A110 in checking register 201, subsequent clearing of core A110 produces an output pulse therefrom, which is coupled to the gating electrode of a controlled rectifier 210 through a forward-poled diode 209. The diode assures that only positive pulses are supplied to the gating electrode of the controlled rectifier. A parallel-connected resistor 211 and capacitor 212 provide coupling between the gating electrode of controlled rectifier 210 and ground. Capacitor 212 serves to integrate each pulse supplied to the gating electrode, while resistor 211 provides a back bias and leakage path for charge stored on capacitor 212. The cathode of controlled rectifier 210 is grounded, while the anode is coupled to a point common to prime windings $P_A$ and $P_B$, which couple prime current to cores A1–A105 and B1–B109, respectively.

Each mark produced by carrier receiver 200 is coupled to the ON input of a flip-flop circuit 215. This flip-flop circuit, when in the "on" condition, energizes the $P_A$ windings through an amplifier 216, and serves to energize the $P_B$ windings in series with the $P_A$ windings when controlled rectifier 210 is in a nonconductive condition. In addition, output energy from flip-flop circuit 215, when switched to the "on" condition, provides a pulse to flip-flop circuit 206 through a capacitor 213, thus switching flip-flop circuit 206 to the "off" condition.

Each mark output produced by carrier receiver 200 is supplied to one input of each of two-input OR circuits 220 and 221. Each space output produced by carrier receiver 200 is supplied to the second input of each of OR circuits 220 and 221. The output of OR circuit 220 is coupled to a rest detector 222. This circuit, which is described in detail infra, provides an output signal to the OFF input of flip-flop circuit 215 whenever no output from OR circuit 220 is received at the input to the rest detector for an interval of predetermined duration. When in the "off" condition, flip-flop circuit 215 fulfills one input to a two-input AND circuit 223 and also provides a permissive signal to the PERM input of a delay circuit 224. The other input to AND circuit 223 is fulfilled by energy supplied from core B110 in checking register 201 in the form of a radio frequency or R.F. signal, to an integrator amplifier 225, which rectifies the R.F. signal and converts it to steady direct current. R.F. energy is produced by core B110 whenever the core is in a set, or ONE condition.

Output signals from OR circuit 221 are coupled through an amplifier 226 to a differentiating circuit 227 in series with a pulse shaper circuit 239. In this fashion, the leading edge of each pulse produced by OR circuit 221 is differentiated, and a pulse of proper amplitude and duration is coupled through the B core drive windings, thereby clearing cores B1–B110. Similarly, output from amplifier 226 is coupled through an inverter 228 to a differentiator circuit 229 in series with a pulse shaper circuit 240. In this fashion, the trailing edge of each pulse produced by OR circuit 221 is differentiated, and a pulse of proper amplitude and duration is coupled through the drive windings of the A cores. Hence, each output pulse produced by pulse shaper circuit 240 clears cores A1–A110, AA1 and AA2.

A message storage 231 is provided for accepting messages from message register 204. Message storage 231 comprises a plurality of multiaperture cores S6–S105, each of which receives energy from message cores B6–B105, respectively, provided a transfer prime signal is supplied through prime windings $P_T$ of cores B6–B105. Each message stored in message storage 231 may then operate utilization means 232 with radio frequency energy supplied from each of the cores in the message storage. The utilization means may, if desired, comprise a visual display panel utilizing separate lamps for indicating the respective separate bits of the message word.

A series RC circuit comprising a resistor 235 and a capacitor 236 is coupled between a source of energy and ground. The point common to resistor 235 and capacitor 236 is coupled to the input of gate circuit 230 through prime windings $P_T$ of cores B6–B105 and the clear windings coupled through cores S6–S105, connected in series. The output of gate circuit 230 is grounded. Thus, when gating terminal G of gate circuit 230 is energized, any charge stored on capacitor 236 is coupled through prime windings $P_T$ and the S cores clear windings, to ground. On the other hand, when gating terminal G of gate circuit 230 is deenergized, no energy is coupled through prime windings $P_T$ and the S cores clear windings; instead, capacitor 236 is charged through resistor 235.

The point common to resistor 235 and capacitor 236 is also coupled to the input of a level detector circuit 237. This circuit, which is described in detail infra, provides an output signal whenever the voltage on capacitor 236 falls to a predetermined value. At this time, output from level detector 237, which is coupled to the input of delay circuit 224, causes the delay circuit to provide an output signal to a one-shot or monostable multivibrator 238. However, sufficient delay exists between the time when the delay circuit is initially actuated and the time when it provides an output signal, to permit the voltage on capacitor 236 to fall substantially to zero. Multivibrator 238 then produces a single output pulse in response to the output signal provided by delay circuit 224, which is of identical width and amplitude to the mark and space output pulses provided by OR circuit 221. The pulses produced by monostable multivibrator 238 are then coupled to the input of amplifier 226, thereby initiating drive of the A and B cores. It should be noted, however that delay circuit 224 can produce an output signal only when the PERM input is energized.

In operation, assume a single complete transmission is received from the field station, following a rest period. Carrier receiver 200 then produces mark and space pulses in accordance with the received code. The first received pulse, being the clearout code, is a ZERO, or space pulse. This space pulse is supplied from receiver 200 through OR circuit 220 to rest detector circuit 222, which then removes energy from the OFF input terminal of flip-flop circuit 215. However, until the ON input terminal of flip-flop circuit 215 is energized, prime windings $P_A$ and $P_B$ remain deenergized. Each space pulse produced by carrier receiver 200 is coupled through OR circuit 221 and amplifier 226, thereby driving the B cores at the instant the pulse is produced, and driving the A cores at the instant the pulse is completed.

Upon completion of the clearout code, the initial check code is next received by carrier receiver 200, which responds by providing a single mark output followed by three space outputs, followed by another mark output. The leading edge of the first mark output is differentiated in differentiator 202, causing a pulse of proper amplitude and duration to be supplied from pulse shaper 203 to core A1 of checking register 201, as well as to core AA1, thereby setting both cores. A ONE is thus initially established in core A1 of checking register 201. Moreover, this initial mark output from carrier receiver 200 switches flip-flop circuit 215 to an "on" condition, whereby prime windings $P_A$ and $P_B$ are energized by current coupled through amplifier 216. In addition, the leading edge of the mark pulse is coupled through OR circuit 221 and amplifier 226 to differentiator circuit 227, for driving cores B1–B110. However, since it is assumed that initially no information is stored in the checking and message registers, driving the B cores has no effect on the circuit. However, the trailing edge of the mark pulse is coupled through OR circuit 221, amplifier 226 and inverter 228, to differentiator circuit 229, for driving cores A1–A110, AA1 and AA2. Cores AA1 and AA2 are thereby cleared, without any effect on the circuit. However, the ONE stored in core A1 is transferred to core B1, and core A1 is cleared.

Receipt of the next space pulse has no effect on the condition of core A1. However, this pulse is coupled through amplifier 226 to differentiator circuit 227, and through inverter 228 to differentiator circuit 229. Thus, on the leading edge of the space pulse, cores B1–B110 are driven, transferring information stored therein to the next-higher numbered A cores, respectively. Hence, the ONE stored in core B1 is transferred to core A2 upon production of the leading edge of the space pulse by carrier receiver 200. Upon production of the trailing edge of the space pulse by the carrier receiver, a drive pulse is supplied to each of the A cores, causing transfer of the information stored therein. Thus, the ZERO stored in core A1 is transferred to core B1, while the ONE stored in core A2 is transferred to core B2.

In the foregoing fashion, information is transferred into the portion of checking register 201 comprising cores A1–A5 and B1–B5. Upon receipt of the entire initial check code, cores B1 and B5 are each in a set condition; that is, they each contain binary ONES. Similarly, cores B2, B3 and B4 are each in a clear condition; that is, they each contain binary ZEROS.

The next code bit received by carrier receiver 200 from the field comprises the first message code bit, which initially was read into stage $f_1$ of the message code portion of transmitting register 113 in the field station of FIG. 1. In addition, the leading edge of the pulse representing the initial message code bit initiates a drive pulse for cores B1–B110. This causes readout of the ONE stored in core B5, representative of the initial ONE of the initial check code, to core A6 of message register 204. Core A6 is thereby operated to a set condition. In addition, the information stored in cores B1–B4 is transferred respectively to cores A2–A5. The trailing edge of the initial message code bit then produces a drive pulse through the A cores which transfers the initial ONE of the initial check code from core A6 into core B6, and simultaneously transfers the initial message code bit from core A1 to core B1. Core B2 now contains the final ONE of the initial check code, while cores B3–B5 each contain one of the ZEROS of the initial check code.

In a manner similar to that already described, the initial check code is transferred alternately through the first one hundred A cores and the first one hundred B cores to the final five stages of message register 204, which are represented by cores A101–A105 and B101–B105. Similarly, when the entire message word has been received by the office, it is stored in the stages of checking register 201 and message register 204 represented by cores A1–A100 and B1–B100.

Upon receipt of the final mark or space pulse of the message word, the trailing edge of the last received pulse causes transfer of all information stored in the checking register and message register of the office from each of the A cores therein to each of the similarly numbered B cores coupled thereto, respectively. Thus, the first ONE of the initial check code arrives at core B105, setting the core.

Receipt of the next bit by carrier receiver 200, which is the first ZERO of the final check code, produces no output from pulse shaper 203, since the output pulse produced by the carrier receiver is a space. Thus, cores A1 and AA1 remain in a clear condition. However, the leading edge of this space pulse drives each of the B cores in the office, in a manner similar to that already described. Core AA2 is therefore set by output driven from core B105, supplying R.F. energy to EXCLUSIVE OR circuit 205. Because core AA1 produces no output to the EXCLUSIVE OR circuit at this instant, the input to AND circuit 208 from the EXCLUSIVE OR circuit is fulfilled. In addition, at the instant core AA2 is set, a single output pulse is supplied to the ON terminal of flip-flop circuit 206. Consequently, flip-flop circuit 206 fulfills the second input of AND circuit 208 which consequently energizes the $P_C$ windings, priming the output minor apertures of cores A106–A110. In addition, a ONE, serving as a tag bit, is established in core A106, since output energy from flip-flop circuit 206 causes one-shot multivibrator 207 to provide a single output pulse to core A106, setting the core. The trailing edge of the space pulse supplied by the receiver, representing the end of the first bit of the final check code, produces a drive pulse through all the A cores of the office. This transfers the initial ZERO of the final check code from core A1 to core B1, the tag bit from core A106 to core B106, and the first ZERO of the initial check code from core A105 to core B105. In addition, core AA2 is cleared, causing removal of current from prime windings $P_C$.

The next pulse received by carrier receiver 200 is the initial ONE of the final check code. This bit causes carrier receiver 200 to provide a mark output pulse, setting cores A1 and AA1. Since core AA2 is clear, EXCLUSIVE OR circuit 205 fulfills one of the inputs to AND circuit 208, while the other input remains fulfilled by output from flip-flop circuit 206, since flip-flop circuit 215, by remaining steadily "on," fails to provide a new output pulse to the OFF input of flip-flop circuit 206. Thus, prime windings $P_C$ are again energized. However, because the condition of flip-flop circuit 206 remains unchanged, no output pulse is provided from one-shot multivibrator 207. Thus, at the instant the B cores are driven, ZEROS are established in cores A1 and A106, while ONES are transferred from cores B1 and B106 to cores A2 and A107, respectively. Also at this instant, the first ZERO of the initial check code is transferred out of core B105 to core AA2, leaving core AA2 in a clear condition, while the second ZERO of the initial check code is transferred to core A105. Completion of the mark pulse produced by the receiver initiates a drive pulse through the A cores, thereby transferring the tag bit to core B107 and the second ZERO of the initial check code to core B105. In addition, core AA1 is cleared, removing energy from prime windings $P_C$.

The next bit received by carrier receiver 200 is the second ONE of the final check code. In a manner similar to that already described, the tag bit is advanced to core B108 and the third ZERO of the initial check code is advanced to core B105. Receipt of the third ONE in the final check code again produces similar circuit operation, with the result now being that the tag bit is situated in core B109 and the final ONE of the initial check code is situated in core B105. In addition, it will be noted that core B4 now contains the first ZERO of the final check code, while cores B1, B2 and B3 now contain the ONES of the final check code. Moreover, cores AA1 and AA2 are now clear.

Receipt of the last bit of the final check code, which provides a space output from carrier receiver 200, establishes a ZERO in cores A1 and AA1. In addition, the leading edge of the space pulse produces a drive pulse through each of the B cores. Thus, core AA2 is set by output from core B105, and again prime windings $P_C$ are energized, in a manner similar to that already described. The entire final check code is now stored in cores A1–A5, while the entire message word is now stored in cores A6–A105. In addition, the tag bit is now stored in core A110, setting the core, which thereupon provides a single output pulse. This pulse energizes the control electrode of controlled rectifier 210. thereby short-circuiting prime windings $P_B$.

Completion of the last bit of the final check code produces a drive pulse through each of the A cores in the office. This transfers the ONE constituting the tag bit into core B110, the entire message word into cores B6–B105 and the entire final check code into cores B1–B5.

Core B110, now containing the tag bit, is in a set condition. In a manner similar to that already described, radio frequency energy is produced from core B110 through integrating amplifier 225 to fulfill one input of AND circuit 223. Moreover, during the time required to receive a single complete transmission from the field station, capacitor 236 has sufficient time to charge to a voltage amplitude substantially equal to that of the supply voltage coupled to resistor 235.

Upon completion of an entire single transmission, the field station rest condition is initiated, as previously described. Thus, for a predetermined interval, comprising the time required to transfer nine bits of information, only the unshifted carrier frequency of the field station transmitter is received by carrier receiver 200. Rest detector 222 responds to the resulting lack of reception of mark and space outputs from the carrier receiver by supplying a signal to the OFF input terminal of flip-flop circuit 215. Flip-flop circuit 215 thus removes energy from the input to amplifier 216, thereby deenergizing the anode of controlled rectifier 210, switching the controlled rectifier into a non-conductive condition. In addition, the PERM input to delay circuit 224 is energized, enabling operation of one-shot multivibrator 238 from level detector 237. Moreover, because both inputs to AND circuit 223 are now fulfilled, gating terminal G of gate circuit 230 is energized, providing a discharge path for capacitor 236 through prime windings $P_T$ and the clear windings for cores S6–S105. Thus, the output minor apertures of cores B6–B105, which are coupled to input minor apertures of cores S6–S105 respectively, are primed, and simultaneously, cores S6–S105 are cleared, erasing any information previously stored therein.

When the voltage on capacitor 236 diminishes to a predetermined amplitude, level detector 237 supplies a signal to the input of delay circuit 224. Because terminal PERM of delay circuit 224 is energized, an output signal is provided by the delay circuit at a predetermined time subsequent to appearance of the output signal from level detector 237. One-shot multivibrator 238 is thereupon driven, supplying a pulse to the input of amplifier 226 which thus drives first the B cores and subsequently the A cores in a manner identical to that by which each mark and space output pulse produced by carrier receiver 200 drives the B and C cores.

Because prime windings $P_T$ have primed the output minor apertures of cores B6–B105, the message bits stored in these cores are transferred into cores S6–S105, respectively, when the B cores are driven. However, at the time a message is to be transferred from message register 204 to message storage 231, there should be no clear current flowing through cores S6–S105, in order to enable these cores to accept the message. It is noted that level detector 237 provides output energy only upon sensing a low, but not zero level of voltage on capacitor 236. Thus, at the time an output signal is produced by level detector 237, capacitor 236 may still be in the process of discharging current through the clear windings of cores S6–S105, thereby preventing these cores from accepting a message transferred from cores B6–B105 at this time. In addition, sufficient time may not yet have elapsed for current through prime windings $P_T$ to prime cores B6–B105. Hence, an additional delay is introduced by delay circuit 224, allowing additional time for capacitor 236 to discharge further towards a zero level of voltage. Thus, when delay circuit 224 finally triggers one-shot multivibrator 238, substantially zero clear current is flowing through cores S6–S105, and the B cores drive pulse produced as a result of one-shot multivibrator 238 being triggered, occurs at a time when cores S6–S105 are in condition to accept the message from cores B6–B105, respectively. The delay circuit, moreover, remains energized until flip-flop circuit 215 is switched back into the "on" condition as a result of a mark pulse produced from received 200. At that time, the delay circuit is switched into a non-conductive condition. The message, when in message storage 231, may then operate utilization means 232.

When flip-flop circuit 215 is in the "off" condition, no current is coupled through prime windings $P_A$ and $P_B$. Hence, the B cores drive pulse which transfers all information stored in message register 204 to message storage 231 also serves to erase all information stored in checking register 201. This leaves all cores in the office, with the exception of the message storage cores, in a clear condition.

Following the rest period, the field station initiates an entirely new transmission, beginning with the clearout code comprising a single ZERO. The clearout code, when received at the office, triggers rest detector 222, which responds by removing energy from the OFF input of flip-flop circuit 215. In addition, the B cores and A cores are each driven once, in order to assure that the cores are clear and thereby prepared to again accept information from the field station. The next pulse received at the office is the first ONE of the initial check code, which sets core A1 of checking register 201, and in addition energizes the ON input of flip-flop circuit 215, which in turn energizes the $P_A$ and $P_B$ windings, removes energy from the input to AND circuit 223 which is coupled thereto, and removes energy from terminal PERM of delay circuit 224.

It should now be obvious to those skilled in the art that the reason for utilizing cores AA1 and AA2 in conjunction with EXCLUSIVE OR circuit 205 is for comparing the initial check code with the final check code to insure that each of the five bits comprising one of the check codes is the respective complement of each of the five bits comprising the other of the check codes. In the event such is not the case, there is a high probability that the message received by carrier receiver 200 is not authentic. Under such circumstances, both cores AA1 and AA2 are simultaneously either set or clear, following a B core drive pulse. Thus, no output is supplied to AND circuit 208 from the EXCLUSIVE OR circuit, preventing prime windings $P_C$ from being energized. Hence, the next-occurring A core drive pulse destroys any information stored in cores A106–A110, without transferring it to any of the B cores. This makes it impossible for the information remaining in message register 204 at the end of the transmission from the field station to ever be transferred into storage, since core B110 remains clear. Thus, no indication is ever produced in response to receipt of this message word, and the authentic message word previously stored in message storage 231 remains stored therein since no current is passed through the S cores clear windings.

Figure 3:
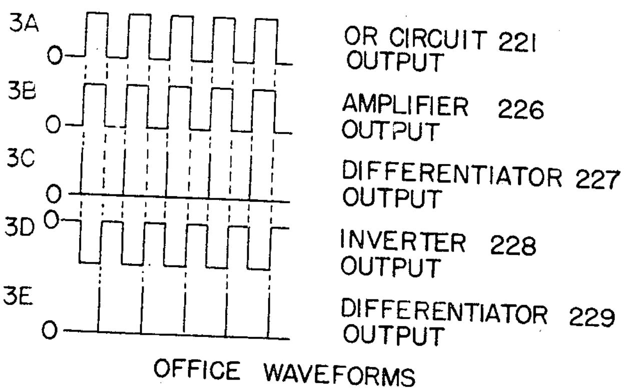
FIG. 3 is a plurality of waveforms to aid in the description of operation of the office.

FIG. 3 is a diagrammatic illustration of waveforms which may be observed at various points in the office. Thus, waveform 3A is illustrative of output voltages produced by OR circuit 221, which is a combination of marks and spaces, whenever a transmission is being received from the field. Waveform 3B is an illustration of the output voltage of amplifier 226 produced in response to an input voltage of the form shown in waveform 3A. It will be noted that no phase inversion takes place in amplifier 226.

Waveform 3C is an illustration of the output voltage produced by differentiator 227. Because this differentiator circuit differentiates only positively-going pulses, output voltages are produced by differentiator 227 upon occurrence of the rising, or leading edges of the pulses produced by amplifier 226. Similarly, the output waveform of amplifier 226 is inverted by inverter 228, and the output pulses produced by the inverter are differentiated by differentiator 229, which also differentiates only positively-going voltages. For this reason, output voltages are produced by differentiator 229 upon occurrence of the trailing edge of each output pulse produced by inverter 228. Thus it will be noted that output voltage pulses produced by differentiators 227 and 229 are produced in alternating fashion at regularly spaced intervals during receipt of each transmission from the field, and consequently pulse shapers 239 and 240 produce drive pulses for the B and A cores respectively, in alternating fashion.

Figure 4:
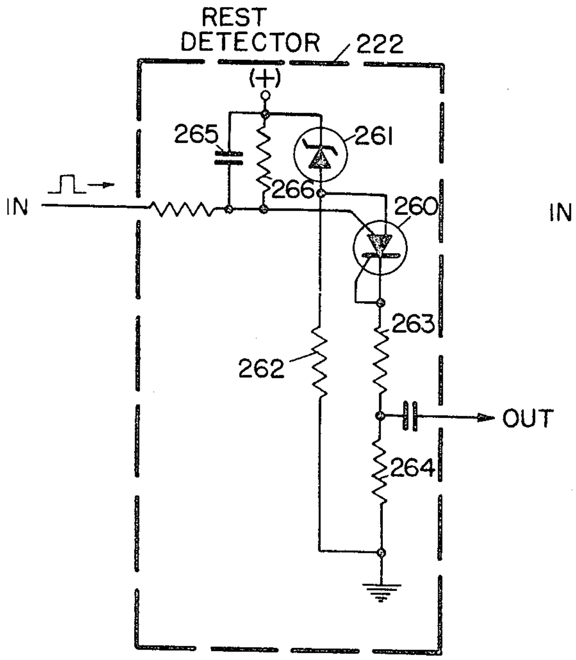
FIG. 4 is a schematic diagram of a rest detector, such as that utilized in the office.

FIG. 4 is a schematic diagram of rest detector 222, used in the office of FIG. 2. This circuit comprises a controlled switch 260, preferably of the type commonly known as silicon controlled switches, having its cathode gate directly connected to the cathode. Positive anode voltage is coupled to the anode of the controlled switch from a point common to a voltage divider comprising a Zener diode 261 in series with a resistor 262. The Zener diode is operated in its broken-down mode, so as to maintain a constant anode potential on controlled switch 260 regardless of the conductive condition of the switch. A pair of series-connected resistors 263 and 264 couple the cathode of controlled switch 260 to ground, for the purpose of providing a load therefor. Output voltage is capacitively coupled from a point common to resistors 263 and 264 to the OFF input of office flip-flop circuit 215.

Positive input pulses are resistively coupled from the output of OR circuit 220 of the office to one side of a parallel RC circuit comprising a capacitor 265 and resistor 266, the other side of which is coupled to the positive bias voltage. Each positive input pulse coupled to the rest detector thus tends to diminish any charge stored on capacitor 265.

As long as marks and spaces are provided from carrier receiver 200 through OR circuit 220 to the input of rest detector 222, capacitor 265 is prevented from acquiring a substantial charge. The anode gate of controlled switch 260 is thus maintained at a positive potential exceeding the positive potential at the anode terminal. This maintains the controlled switch in a nonconductive condition, so that no output is produced by the rest detector.

However, when no marks and spaces are produced from carrier receiver 200 for a predetermined period of time, depending upon the time required for capacitor 265 to acquire a charge through the anode gate of controlled rectifier 260 and thereby produce a voltage across capacitor 265 in excess of the voltage drop across Zener diode 261, the anode gate of controlled switch 260 is driven negative with respect to the anode, operating the controlled switch to a conductive mode. A shape increase in voltage drop across resistor 264 is thus produced, resulting in production of a positive output voltage by rest detector 222 which energizes the OFF input of flip-flop circuit 215. The controlled switch then remains in its conductive condition, until the next output pulse is produced from OR circuit 220, which then abruptly diminishes the voltage stored across capacitor 265 to a point where the anode gate of controlled switch 260 again swings positive with respect to the anode, operating the controlled switch back into its nonconductive mode.

Figure 5:
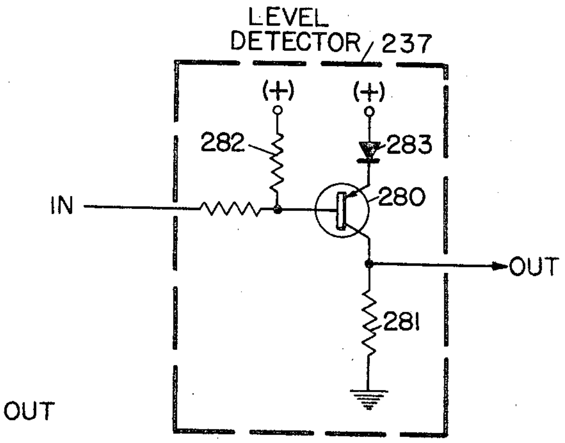
FIG. 5 is a schematic diagram of a level detector, such as that utilized in the office.

FIG. 5 is a schematic diagram of level detector 237, used in the office. This circuit comprises a transistor 280 having its emitter coupled to a source of bias through a forward-poled diode 283 and its collector coupled to ground through a load resistor 281. Base bias is supplied through a resistor 282.

In operation, when capacitor 236 of the office apparatus is substantially fully charged, a positive bias is resistively coupled therefrom to the base of transistor 280, maintaining the transistor in a nonconductive condition. This condition is achieved due to the forward voltage drop across diode 283, which permits the base to be driven further positive than the emitter. Output voltage supplied by the level detector is then substantially at ground potential. However, when capacitor 236 is discharged due to gate 230 being rendered conductive, the potential supplied to the base of transistor 280 diminishes to a value which eventually becomes low enough to drive the transistor into conduction. This produces an abrupt increase in the voltage drop across resistor 280, thereby providing a positive output voltage to delay circuit 224 of the office.

Figure 6:
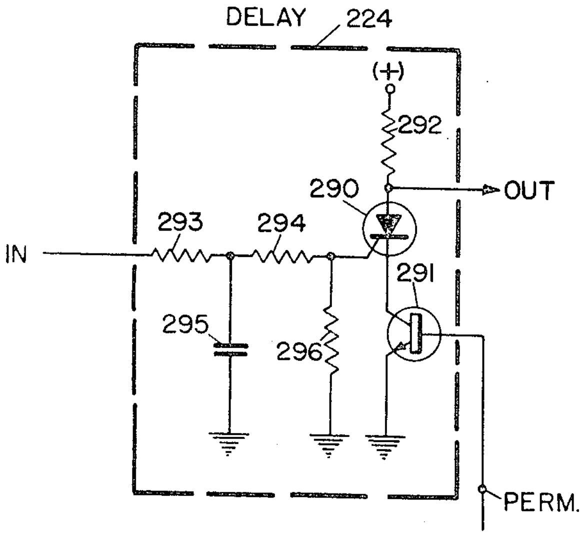
FIG. 6 is a schematic diagram of a delay circuit, such as that utilized in the office.

FIG. 6 is a schematic diagram of a delay circuit 224, such as that shown in block form in FIG. 2. This circuit comprises a controlled rectifier 290 receiving positive bias at its anode through a resistor 292. In addition, the cathode of controlled rectifier 290 is coupled to the collector of a transistor 291, the emitter of which is grounded. Positive voltage is supplied through permissive terminal PERM to the base of transistor 291 from the output of office flip-flop circuit 215 when the flip-flop circuit is in its "off" condition. Positive voltages are supplied to the control electrode of controlled rectifier 290 through a pair of series-connected resistors 293 and 294 from level detector 237. A capacitor 295 couples a point common to resistors 293 and 294 to ground. In addition, the control electrode is coupled to ground through a small biasing resistor 296.

In operation, whenever flip-flop circuit 215 is in an "on" condition, the base of transistor 291 is held substantially at ground potential. The collector-to-emitter circuit of the transistor thus provide a high impedance in the cathode circuit of controlled rectifier 290, preventing the controlled rectifier from conducting. However, when flip-flop circuit 215 is in an "off" condition, the base of transistor 291 is driven positive, operating the transistor to its conductive, or low impedance mode. The cathode circuit of controlled rectifier 290 may thus be considered completed.

Assuming that transistor 291 is in its conductive mode, whenever the output voltage of level detector 237 swings positive, capacitor 295 begins to charge at a rate substantially controlled by the RC time-constant of resistor 293 and capacitor 295. When the voltage across capacitor 295 rises to a sufficiently high value, the controlled rectifier is triggered into conduction by application of this voltage to the gating electrode through current-limiting resistor 294. The resulting sharp drop in positive output voltage produced by the delay circuit triggers one-shot multivibrator 238 of the office into one complete cycle of operation. Those skilled in the art will recognize that once controlled rectifier 290 is triggered into conduction, this conduction may be halted only by substantially lowering the anode-cathode current. This is accomplished when flip-flop circuit 215 is switched back into its "on" condition, returning the base of transistor 291 substantially to ground potential and thereby operating the transistor back into its high impedance mode. The resulting high cathode circuit impedance halts the flow of current through the controlled rectifier and load resistor 292.

Figure 7:
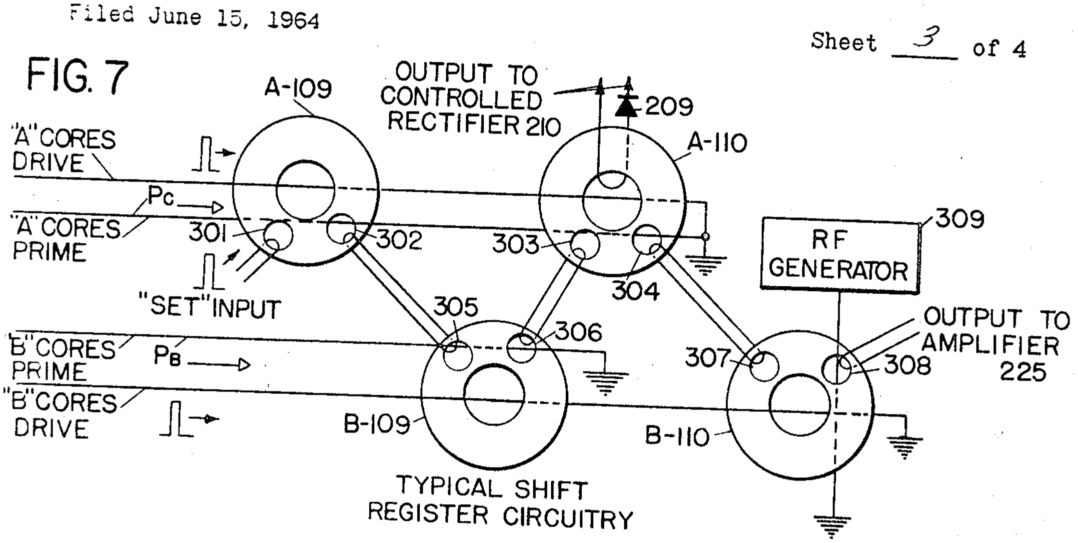
FIG. 7 is a schematic diagram of typical shift register circuitry, such as that utilized in the office.

Turning now to FIG. 7, there is shown, schematically, for purposes of illustrating typical multiaperture core circuit connections, a portion of checking register 201. Illustrated are cores A109, B109, A110 and B110. Prime windings $P_C$ are threaded through minor apertures 302 and 304 of cores A109 and A110, respectively. Similarly, prime windings $P_B$ are threaded through minor aperture 306 of core B109. Radio frequency current is supplied through a minor aperture 308 of core B110 from a radio frequency generator 309. Cores A109 and A110 are cleared by a positive A cores drive pulse passed through the major apertures therein, while cores B109 and B110 are cleared by a positive B cores drive passed through the major apertures therein. Core A109 is set by current flow through minor aperture 301. Core B109 is set by current flow though minor aperture 305, which is produced from minor aperture 302 upon clearing of core A109 if core A109 is set and minor aperture 302 is primed. Similarly, core A110 is set by current flow through minor aperture 303, which is produced from minor aperture 306 upon clearing of core B109 if core B109 is set and minor aperture 306 is primed, and core B110 is set by current flow through minor aperture 307, which is produced from minor aperture 304 upon clearing of core A110 if core A110 is set and minor aperture 304 is primed. Those skilled in the art will recognize that a single output pulse is produced by core A110 upon being set, due to overall flux change within the core when the core is switched into a set condition from the clear condition. Presence of diode 209 prevents occurrence of an output pulse when the core is switched from its set condition back into a clear condition. The advantage in using major aperture readout of core A110 lies in the fact that many additional turns may be coupled through a major aperture in comparison with a minor aperture, thereby permitting larger amplitude output voltage pulses to be produced by the core. Those skilled in the art will also recognize that by coupling radio frequency energy through minor aperture 308 of core B110, a radio frequency output voltage is produced from this minor aperture when the core is in a set condition, while when the core is clear no output signal is produced therefrom.

Assume a ONE is to be transferred into core A109 from preceding core B108, shown in FIG. 2. When core B108 is cleared, a set pulse is coupled through minor aperture 301 of core A109 which switches the core to a set condition, thereby establishing the ONE therein. When core A109 is subsequently cleared, a pulse of energy originating from core A109 is coupled through minor aperture 305 of core B109, switching core B109 to a set condition and thus transferring the ONE to core B109. The next B cores drive pulse then transfers the ONE to core A110 in similar fashion, thereby setting the core and providing an output pulse to controlled rectifier 210, as previously described. In addition, assume the bit immediately succeeding the ONE which has been transferred to core A110 is a ZERO. When this bit is established in core B108, clearing of core B108 produces no output pulse to core A109; therefore, core A109 remains clear upon occurrence of the B cores drive pulse, and the ZERO is thus established in core A109. Occurrence of the next-following A cores drive pulse then produces a pulse of energy from core A109 which passes through minor aperture 307 of core B110, but produces no energy from core A109 through minor aperture 305 of core B109. At this juncture, core B110 is set, indicating existence of a ONE therein, while core B109 is clear, indicating existence of a ZERO therein. In addition, a radio frequency voltage is supplied from output minor aperture 308 to amplifier 225. Operation of the other cores in the office of FIG. 2 is analagous to operation of the cores as just described.

Figure 8:
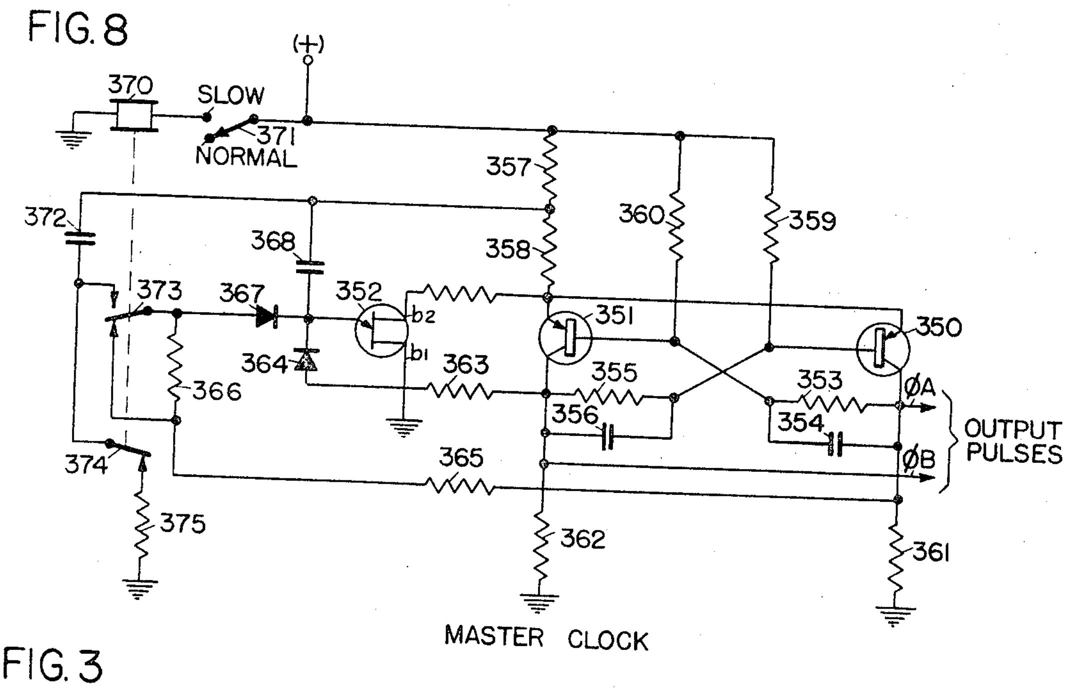
FIG. 8 is a schematic diagram of the master clock, which controls the rate of bit transmission in the system.

FIG. 8 is a schematic diagram of master clock 101, shown in block form in FIG. 1. This circuit comprises a pair of transistor 350 and 351 connected in a conventional bistable multivibrator circuit configuration. Thus, the base of transistor 351 is coupled to the collector of transistor 350 through a parallel-connected resistor 353 and capacitor 354. Similarly, the base of transistor 350 is coupled to the collector of transistor 351 through a parallel-connected resistor 355 and capacitor 356. The emitters of transistors 350 and 351 are connected together, and receive positive bias through a pair of series-connected resistors 357 and 358. Positive base bias is supplied to transistor 350 through a resistor 359 and to transistor 351 through a resistor 360. A collector load resistor 361 couples the collector of transistor 350 to ground, while a collector load resistor 362 couples the collector of transistor 351 to ground. Output pulses of phase $\phi$A are supplied from the collector of transistor 350, while output pulses of phase $\phi$B are supplied from the collector of transistor 351. Each complete cycle of master clock operation produces a $\phi$A pulse followed by a $\phi$B pulse.

In addition to the basic flip-flop circuit just described, a unijunction transistor 352 is utilized to provide timed trigger pulses for the flip-flop circuit. Base $b2$ of transistor 352 is resistively coupled to the collector of transistor 351, while base $b1$ of transistor 352 is grounded. The collector of transistor 351 is coupled to the emitter of the unijunction transistor through a series-connected resistor 363 and diode 364. Similarly, the collector of transistor 350 is coupled to the emitter of the unijunction transistor through a series circuit comprising resistors 365 and 366 and a diode 367. Resistors 363 and 365 are preferably identical in size. A capacitor 368 provides coupling between a point common to resistors 357 and 358, and the emitter of unijunction transistor 352.

A slow speed relay 370 is energized from a selector switch 371, which enables selection of either normal or slow output pulses. A capacitor 372 is connected between the point common to resistors 357 and 358, and a front contact 373 of relay 370. Front contact 373 is coupled to the heel of a second contact 374 of relay 370. Back contact 374 is coupled to ground through a resistor 375. The heel of contact 373 is coupled to a point common to resistor 366 and the anode of diode 377, while back contact 373 is coupled to a point common to resistors 365 and 366.

In operation, assume first that normal operation is selected by the position of selector switch 371. Thus, when power is supplied to the master clock, relay 370 remains deenergized, and capacitor 372 acquires a steady-state charge through resistors 357 and 375 in series, thereby leaving the circuit unaffected.

At the instant power is initially supplied to the master clock, capacitor 368 is uncharged. Thus, a large positive potential is immediately supplied to the emitter of unijunction transistor 352, causing it to fire. This draws current through resistor 357 in series with resistor 358, dropping the emitter voltage on both transistors 350 and 351. Thus, transistors 350 and 351 are both driven into cutoff.

After capacitor 368 has acquired a sufficient charge, the emitter voltage on unijunction transistor 352 is sufficiently lowered to a value at which the unijunction transistor ceases conduction. The flow of current through resistor 357 due to charging of capacitor 368 thus ceases, raising the emitter voltage on both transistors 350 and 351. At this juncture, either transistor 350 or 351 begins conduction, depending on circuit instabilities, as is well known in the art. A steady-state potential remains on capacitor 368, maintaining unijunction transistor 352 at cutoff.

Assume that the flip-flop circuit begins operation by conduction occurring through transistor 351. This produces a positive voltage pulse at the collector of transistor 351, which is coupled through resistor 363 and diode 364 to the emitter of unijunction transistor 352. After a predetermined interval during which the existing steady-state potential on capacitor 368 is diminished, the emitter voltage on unijunction transistor 352 rises to a sufficiently high value to fire the unijunction transistor, drawing additional current through resistor 357 in series with capacitor 368. Consequently, emitter voltage on transistors 350 and 351 drops, driving both of these transistors into cutoff. The resulting drop in potential on the collector of transistor 351 results in an increase in charge on capacitor 368 which lowers the emitter potential on unijunction transistor 352 sufficiently to drive the unijunction transistor out of conduction. Capacitor 368 is left with a charge thereon tending to bias the emitter of the unijunction transistor negative with respect to base $b2$ and maintain the unijunction transistor nonconductive.

When unijunction transistor 352 ceases conduction, the additional current flow through resistor 357 ceases, again raising the emitter voltage on both transistors 350 and 351. During the preceding period in which transistor 351 was in conduction, the voltage drop across the parallel combination of resistor 355 and capacitor 356 was smaller than the voltage drop across resistor 353 and capacitor 354 in parallel, since the values of resistors 359 and 360 are identical, the values of resistors 353 and 355 are identical, the values of capacitors 354 and 356 are identical, and the collector voltage on transistor 351 exceeded that on transistor 350. Therefore, when both transistors 350 and 351 subsequently become non-conductive, the base of transistor 351 is driven further positive than the base of transistor 350. Hence, transistor 350 begins conduction, producing a $\phi$A output pulse, and coupling a positive pulse to the emitter of unijunction transistor 352 through resistor 365 in series with back contact 373 of relay 370 and diode 367. This positive pulse serves to diminish the charge on capacitor 368, thereby permitting an increase in voltage on the emitter of the unijunction transistor at a rate controlled substantially by the RC time-constant of resistor 365 in series with capacitor 368, since resistor 357 is considerably smaller in size than resistor 365. When the charge on capacitor 368 is decreased to a sufficiently low value, the positive potential on the emitter of unijunction transistor 352 is sufficient to again fire the unijunction transistor. A large voltage drop again appears across resistor 357 due to charging current drawn by capacitor 368 in series with the unijunction transistor, driving transistors 350 and 351 into cutoff. At this instant, the voltage drop across resistor 361 falls substantially to zero, and capacitor 368 increases its charge, causing unijunction transistor 352 to cease conduction. This decreases the voltage drop across resistor 357, thereby increasing the emitter voltage on transistors 350 and 351. At this time, however, the voltage amplitude on capacitor 354 is less than the voltage amplitude on capacitor 356, due to the previous voltage drop across resistor 361. Hence, the base of transistor 351 is less positive with respect to ground than the base of transistor 350, so that transistor 351 is driven into conduction. A $\phi$B output pulse is thus produced by the master clock, due to the positive voltage drop across resistor 362. In addition, this positive voltage is coupled through resistor 363 and diode 364 to the emitter of the unijunction transistor, and diminishes the voltage stored on capacitor 368 at a rate substantially controlled by the RC time-constant of resistor 363 and capacitor 368 in series, until unijunction transistor 352 fires again. The cycle then repeats itself, and so on.

It is, however, highly desirable to be capable of slowing the rate at which bits are transmitted from the field to the office, thereby facilitating visual observation of the progress of message bits through the system. Thus, from a normal transmission rate of two thousand bits of information per second, it is advisable to slow the transmission rate to at least the maximum rate at which the human eye can readily follow a visual display of the bits as they progress through the system. Such rate is approximately one bit per second. Although it is theoretically possible to slow the transmission rate by adding a large value of resistance in series with capacitor 368, so as to greatly increase the RC time-constant of the circuit, it is practically impossible to increase the circuit time constant by a factor of approximately two thousand simply by adding resistance. It is more feasible to add both resistance and capacitance in order to achieve this objective. This is accomplished by closing the SLOW contact of switch 371, thereby energizing relay 370. Opening of back contact 374 then removes ground potential from one side of capacitor 372, while opening of back contact 373 removes the short-circuit across resistor 366. Closure of front contact 373 connects capacitor 372 in a series circuit with resistors 365 and 366, thereby providing a long time-constant capacitor charging circuit. Thus, when a positive voltage pulse is produced across resistor 361, a large time lapse occurs before the charge on capacitor 372 is diminished to a value permitting unijunction transistor 352 to fire. It should be noted that because capacitors 372 and 368 are connected substantially in parallel, and since diode 367 is in forward conduction when a voltage is present across resistor 361, capacitor 368 is charged in parallel with capacitor 372 and hence is restricted to charge at the same rate as capacitor 372. Therefore, when in slow operation, there exists a large interval from the time a positive pulse first appears across resistor 361 to the time a positive pulse first appears across resistor 362. On the other hand, when a positive voltage appears across resistor 362, due to transistor 351 being in conduction, diode 367 is in a blocked condition and capacitor 368 is charged at a rate still determined substantially by the sizes of resistor 363 and capacitor 368. Thus, the voltage on resistor 362 exists for a much smaller interval of time than the voltage on resistor 361. It can be seen, therefore, that when in slow operation, the master clock provides pairs of unequal length output pulses which recur at intervals of approximately one second, while each pulse in every pair is separate from the other pulse in that pair by a time interval on the order of a few milliseconds. In the slow mode of operation, the time required for an entire transmission from the field to be received at the office would be approximately 120 or 121 seconds, for a 100 bit message, a 10 bit checking code, and a 9 bit rest period. This slow rate of transmission is obviously a boon to circuit troubleshooting. Moreover, since the long pulses create the marks and spaces from the field station, while the short pulses create the rest frequency intervals, the intervals between bits received by rest detector 222 of the office is the same in both normal and slow system operation.

Thus, there has been shown a telemetering system for transmitting codes from a field station to a control office with full assurance that the received message is authentic. The system operates at high speed, with minimal power and space requirements, and permits monitoring of field functions substantially continuously at the office location. In addition, slow bit transmission speed may be provided from the field in order to facilitate rapid location of malfunctioning apparatus.

Although but one embodiment of the invention has been described, it is to be specifically understood that this form is selected to facilitate in disclosure of the invention rather than to limit the number of forms which it may assume. For example, timing circuit 100 of the field station may comprise any high accuracy timer capable of producing output signals at predetermined intervals. Various other modifications and adaptations may be applied to the specific form shown to meet requirements of practice, without in any manner departing from the spirit or scope of the invention.

What is claimed is:

1. A code communication system comprising: timing means; means driven by said timing means for serially transmitting coded data, said data including a first predetermined code at the beginning of each transmission, a message in the middle portion of the transmission, and a second predetermined code at the end of the transmission; and a receiving station, said receiving station including receiver means communicably linked with said driven means for receiving said coded data, means responsive to said receiver means for accumulating the first predetermined code and the message, means responsive to said receiver means and said accumulating means for comparing each digit of the first predetermined code with each corresponding ordinal digit of the second predetermined code, utilization means responsive to said accumulating means, and means coupling the output of said comparing means to said accumulating means for transferring the message to the utilization means.

2. The code communication system of claim 1 wherein said timing means includes pulse-producing means and means driven by said pulse-producing means for demarcating each successive transmission.

3. The code communication system of claim 1 wherein the second predetermined code is the complement of the first predetermined code, and the means responsive to said receiver means and said accumulating means checks that each ordinal digit of the second predetermined code is the complement of its corresponding digit in the first predetermined code.

4. The code communication system of claim 3 wherein the bits are normally transmitted at a high rate of speed and the means for serially transmitting code data includes means for slowing said normal transmission rate to a slower transmission rate.

5. A code communication system comprising: timing means; means driven by said timing means for serially transmitting coded data, said data including a first predetermined code at the beginning of each transmission, a message in the middle portion of the transmission, and a second predetermined code at the end of the transmission; and a receiving station, said receiving station including receiver means communicably linked with said driven means for receiving said coded data, means responsive to said receiver means for accumulating the first predetermined code and the message, an EXCLUSIVE OR circuit, means coupling said receiver means and said accumulating means to said EXCLUSIVE OR circuit, code generating means responsive to said accumulating means for reconstructing an initial portion of the first predetermined code, gating means responsive to said EXCLUSIVE OR circuit and said code generating means, and means coupling said gating means to said accumulating means for permitting the first predetermined code to further advance into the accumulating means.

6. The code communication system of claim 5 wherein said timing means includes pulse-producing means and means driven by said pulse-producing means for demarcating each successive transmission.

7. A code communication system comprising: pulse generating means providing repetitive output pulses; means driven by said pulse generating means for serially transmitting coded data, said data including a first predetermined code at the beginning of each transmission, a message in the middle portion of the transmission, and a second predetermined code at the end of the transmission; and a receiving station, said receiving station including receiver means communicably linked with said driven means for receiving said coded data, first accumulating means responsive to said receiver means for accumulating the first predetermined code and the message, comparison means responsive to said receiver means and said first accumulating means for comparing each digit of the first predetermined code with each corresponding ordinal digit of the second predetermined code, code generating means responsive to said comparison means for reconstructing an initial portion of the first predetermined code, second accumulating means responsive to said code generating means for accumulating the reconstructed portion of the first predetermined code, storage means coupled to the first accumulating means, and means coupling the output of said second accumulating means to said first accumulating means for producing transfer of the message to the storage means.

8. The code communication system of claim 7 wherein said comparison means includes an EXCLUSIVE OR circuit responsive to said receiver means and said first accumulating means, gating means responsive to said EXCLUSIVE OR circuit and said code generating means, and means coupling said gating means to said second accumulating means for controlling acceptance of coded data by said second accumulating means.

9. The code communication system of claim 7 including timing means responsive to said receiver means and coupled to said first and second accumulating means and said storage means for erasing all information existing in said first and second accumulating means and said storage means in response to a predetermined interval during which said receiver means remains in a rest condition.

10. The code communication system of claim 7 wherein said first accumulating means comprises first shift register means and second shift register means connected in series therewith, and the second accumulating means comprises third shift register means for producing transfer of the message to the storage means only after the message has entirely filled the second shift register means.

11. The code communication system of claim 9 wherein said first accumulating means comprises first shift register means and second shift register means connected in series therewith, and the second accumulating means comprises third shift register means for producing transfer of the message to the storage means only after the message has entirely filled the second shift register means.

12. A code communication system comprising: timed pulse-producing means; means driven by said pulse-producing means for serially transmitting binary-coded data, said data including a first predetermined code at the beginning of each transmission, a message in the middle portion of the transmission, and a second predetermined code at the end of the transmission; and a receiving station, said receiving station including receiver means communicably linked with said driven means for receiving said binary-coded data, first accumulating means responsive to said receiver means for accumulating the first predetermined code and the message, comparison means responsive to said receiver means and said first accumulating means for comparing each digit of the first predetermined code with each corresponding ordinal digit of the second predetermined code, second accumulating means responsive to said comparison means for receiving an initial portion of the first predetermined code, utilization means responsive to the first accumulating means, and means coupling the output of said second accumulating means to said first accumulating means for initiating transfer of the message from said first accumulating means to the utilization means.

13. The code communication system of claim 12 wherein said first accumulating means comprises first shift register means and second shift register means connected in series therewith, and the second accumulating means comprises third shift register means for producing transfer of the message to the utilization means only after the message has entirely filled the second shift register means.

14. The code communication system of claim 13 wherein each stage of said second shift register means includes a multi-aperture core having an output minor aperture therein and means magnetically coupling each said core through said output minor aperture therein to said utilization means, and said means coupling the output of said second accumulating means to said first accumulating means includes means responsive to the final stage of the third shift register means for supplying priming current through each of said output minor apertures.

References Cited

UNITED STATES PATENTS

| | | | |
|---|---|---|---|
| 2,640,872 | 6/1953 | Hartley et al. | 340—146.1 X |
| 3,001,176 | 9/1961 | Ingham | 340—146.1 X |
| 3,252,138 | 5/1966 | Young | 340—146.1 |
| 3,267,213 | 8/1966 | Berger | 178—22 X |

MALCOLM A. MORRISON, *Primary Examiner.*

C. E. ATKINSON, *Assistant Examiner.*

U.S. Cl. X.R.

340—213